INVENTOR.
ERWIN W. KNOTH
BY Price, Heneveld
Huizenga & Cooper
ATTORNEYS

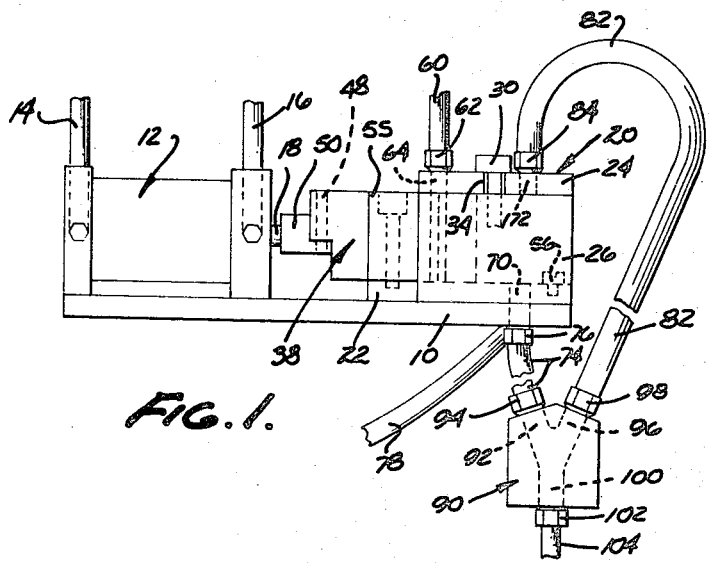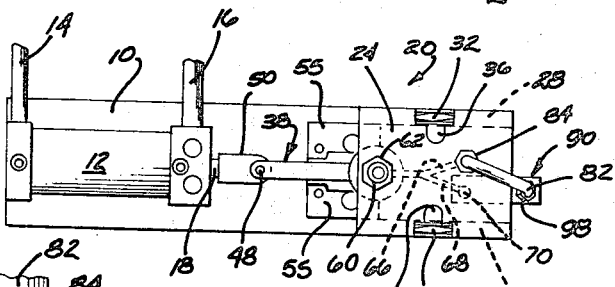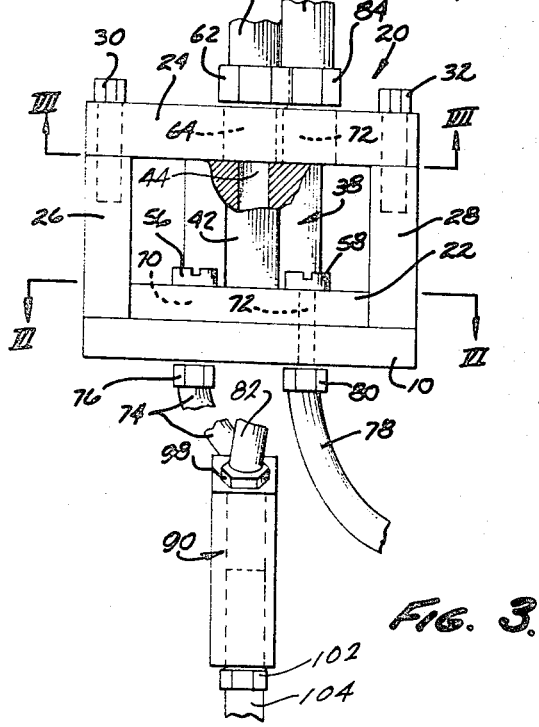

United States Patent Office 3,419,129
Patented Dec. 31, 1968

3,419,129
DEVICE FOR ORIENTING PARTS AND THE LIKE
Erwin W. Knoth, Grand Rapids, Mich., assignor to Crampton Manufacturing Company, Grand Rapids, Mich., a corporation of Michigan
Filed Mar. 16, 1967, Ser. No. 623,714
12 Claims. (Cl. 198—33)

ABSTRACT OF THE DISCLOSURE

The device of the invention comprises a reciprocating shuttle means having a chamber in which a stud or like part is deposited at the starting point in the path of movement of the shuttle means. The shuttle means carries the part deposited in its chamber to one of two terminal locations, where the part is removed from the shuttle means chamber. The particular one of these two terminal locations to which the shuttle means travels is determined by the particular orientation of the part carried by the shuttle means, i.e., whether a selected end of the part (such as a dog point) is oriented upwardly or downwardly. This particular end of the part is selected as the one having the smaller diameter, and the shuttle means chamber is of a size such that one end of the part must protrude outwardly therefrom. Guideways are provided on each side of the shuttle means chamber for engaging this smaller end of the part, but these guideways are each of a size to engage only the aforesaid smaller end of the part. The two guideways extend in the same general direction, i.e., that of the shuttle means travel, but they diverge from each other and each terminates at a different point. The shuttle means itself is free to follow either guideway, and it does follow the particular guideway with which the smaller end of the part carried by the shuttle means is engaged. Consequently, parts removed from the shuttle means chamber at one terminal location will be pointed a first particular way, whereas parts removed from the chamber at the other terminal location will be pointed in the opposite direction; in either event, however, the parts will be uniformly oriented at their particular terminal location. The invention also includes a device for integrating the two streams of oppositely oriented parts from the two terminal locations, so that a single final output stream is provided in which all parts are oriented in the same manner.

---

This invention relates to apparatus for uniformly orienting parts, and more particularly to a device for receiving a continuous supply of randomly oriented parts of the same size and shape and quickly and continuously providing a coherent output supply of such parts which occur in the same physical orientation, so that such parts may then be used in automated assembly techniques.

It very often occurs in manufacturing and other industrial endeavors that certain types of parts, such as for example studs, pins, and the like, which have dissimilar opposite end configurations are to be used in assembling a particular product. Where parts of this general nature are completely symmetrical and have identical end portions, they lend themselves readily to automated manufacturing techniques, since it is an easy matter to merely place them in an end-to-end stream within a conduit or the like and then feed them to an assembling machine. However, many such parts are not symmetrical and have opposite end portions which are different in size and/or shape. Such is true, for example, of the single dog-point stud which, as is well known, is threaded along a major portion of its length, directly up to one end extremity, but which has a dog-point or cylindrical end projection of reduced diameter at its other end extremity, commonly used to guide the stud into a blind or substantially blind threaded aperture, or for other purposes.

Parts of the latter nature are supplied in bulk lots in cartons or kegs and the like, in which they occur in a randomly oriented mixture. In order to use such parts, a manual sorting and orienting step is required before automated assembly equipment can be used, since there presently appears to be no device available which automatically or mechanically takes the disoriented and randomly mixed studs or like parts and orients them in a continuous and known order of occurrence. Because of the manual orienting procedure which their use requires, whenever parts of this nature are called for in an assembly procedure excessive labor costs are encountered, along with excessive delay. Thus, it is not surprising that such parts as these are held in rather low regard in present-day industry.

It is a major object of the present invention to provide a device which, when supplied a steady stream of randomly oriented parts, i.e., a stream in which parts may have either of their different end configurations occurring either upstream or downstream, will rapidly and steadily produce an output stream of coherently or uniformly oriented parts, i.e., with similar end extremities always occurring at a preselected upstream or downstream position. Thus, one of the major advantages of the invention is that such parts may, through the use of the invention, be used as easily as any other functionally similar part which has a symmetrical configuration, since the laborious and time-consuming manual operation is eliminated by the invention and hence is no longer required.

A further important object of the invention is to provide a device of the foregoing nature which is double-acting, and in which the output stream of oriented parts contains the same number of parts as the input stream of randomly oriented parts; that is, the device does not merely allow parts having a certain orientation to pass onward while rejecting parts having other orientations, but instead actually re-orients some of the parts present in the output stream.

The foregoing major objects of the invention and the advantages provided thereby, together with other objects and advantages equally a part thereof, will become increasingly apparent following consideration of the ensuing specification and its appended claims, particularly when taken in conjunction with the accompanying illustrative drawings setting forth a preferred embodiment of the invention.

In the drawings:

FIG. 1 is a fragmentary side elevation of the device of the invention;

FIG. 2 is a fragmentary overhead plan view of the structure of FIG. 1;

FIG. 3 is an end elevation of the structure of FIGS. 1 and 2;

FIG. 8 is a fragmentary sectional elevation showing the stud of FIG. 5 as positioned between the structures of FIGS. 6 and 7 in a first possible orientation;

Figure 4:
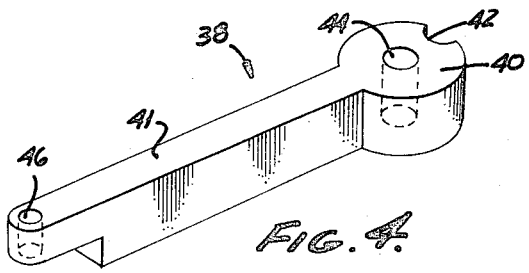
FIG. 4 is an enlarged lateral perspective view of a component of the device of the previous figures.

Briefly stated, the present invention provides a device for placing in a uniform orientation randomly mixed or oriented parts of the same size and shape but which have a pair of physically different opposite end extremities, in a manner whereby a given one such end extremity always occurs in a predetermined relative position within a continuous stream of such parts leaving the device. Generally stated, this is accomplished by use of a reciprocating shuttle means having a chamber for receiving and carrying a single such part with each reciprocation. The chamber is of a size such that at least one end of the part to be oriented protrudes outwardly therefrom, and a pair of oppositely-disposed guideways are provided, each having a side edge of a size and shape to slideably engage a selected one of the dissimilar ends of the part as such end protrudes out of the aforesaid chamber. The particular guideway engaging such end of a given part acts to guide the motion of the reciprocating shuttle, as determined by the relative position of the aforesaid preselected one end of the part, with the shuttle means moving to one or the other of a pair of terminal locations according to the foregoing principle. The parts thus leave the terminal locations in a pair of streams, in each of which all parts are oriented in the same direction. The two streams then pass into a combining or integrating means which combines the two streams into a single output stream in which all parts are oriented in the same direction.

Referring now in more detail to the drawings and especially to FIGS. 1, 2, and 3, the device of the invention is comprised of a flat base plate 10, upon which is mounted a double-acting penumatic power cylinder 12 having air-inlet conduits 14 and 16 connected to its opposite ends for actuating an extendable plunger means 18 inwardly and outwardly of the cylinder. On the end of the base plate 10 opposite the cylinder 12 is mounted the orienting portion of the device. In general, this orienting means includes a box-like walled enclosure 20 formed by a lower wear plate 22, an upper wear plate 24, and opposite side walls 26 and 28. The side plates or walls 26 and 28 extend downwardly to the base plate 10 on opposite sides of the lower wear plate 22, which is positioned directly atop the base plate, upper wear plate 24 reaches across and is secured atop the opposite side walls, preferably by a pair of quarter-turn screws or bolts 30 and 32 which thread downwardly into the side walls 26 and 28. As will be understood, the bolts 30 and 32 are referred to as "quarter-turn" because they have flattened, elongated, upright heads which are narrower than a pair of channels or slots 34 and 36 extending transversely into the upper wear plate 24, such that these slots will readily pass over the heads of the bolts whenever the same are brought into alignment therewith, i.e., every quarter turn of the bolts. In this manner, the upper wear plate 24 may be tightly secured atop the two side walls 26 and 28, yet may quickly be removed therefrom by turning each of the bolts no more than one-quarter of a revolution.

Slideably positioned between the two wear plates 22 and 24 is a shuttle means 38, which is illustrated in detail in FIG. 4. This member is flat on its top and bottom surfaces and has a rounded, enlarged head 40 at one end of an elongated shank 41. The head portion 40 has a vertical semi-cylindrical groove 42 formed therein in alinement with the longitudinal axis of the shank 41, and the head 40 also has a vertical hole 44 passing through it from top to bottom and forming what is referred to herein as a chamber. Further, the shuttle means has a vertically extending hole 46 in the shank at its end opposite the head 40, which is sufficiently large to slideably fit over an upstanding pin 48 (FIG. 1) mounted in a coupling 50 which is attached to the plunger 18 of the pneumatic power cylinder 12. In this manner, the shuttle means 38 is pivotally attached to the coupling 50, so as to be movable with respect thereto in a horizontal plane.

Figure 5:
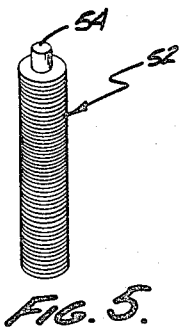
FIG. 5 is a frontal perspective view of a typical single dog-point stud such as the device of the invention is used to orient.

A single dog-point stud 52, exemplary of the type of part which is oriented by the device of the invention, is illustrated in FIG. 5. The stud 52 is externally threaded over most of its length, but at one end it has a protruding "dog point" 54 which is cylindrical and at least slightly smaller in diameter than the threaded portion of the stud. The hole or chamber 44 in the rounded head portion 40 of the shuttle means 38 should be large enough in diameter to readily receive the stud 52, and the relative height of the stud and the thickness of the shuttle means head should be such that when such a stud is placed within the chamber 44, one end or the other of the stud will protrude outwardly beyond the top or bottom surface of the head portion 40 of the shuttle means.

As previously stated, the shuttle means is located within the enclosure 20 of the device, between the lower and upper wear plates 22 and 24 thereof. In this location, the shuttle means is reciprocable between first and second positions by operation of the pneumatic power cylinder 12. That is, when the plunger means 18 of the power cylinder is in its retracted position (shown in FIGS. 1, 2, and 3), brought about by pressurized air supplied to the power cylinder through conduit 16, the head portion 40 of the shuttle means will be located at the leftward end of the enclosure, which is referred to herein as the first position of the shuttle means. In this position, the shuttle means is centered and positioned by a pair of stop blocks 55 (FIGS. 1 and 2) having an arcuately rounded recess in their forward central extremities for receiving the rearward portions of the rounded head 40 of the shuttle means. When the cylinder is actuated by pressurized air sent through conduit 14 to extend its plunger 18, the shuttle means 38 is pushed toward the right as seen in FIGS. 1 and 2, to a position in which the vertical groove 42 in the front edge of the shuttle means head is brought into abutting contact with one or the other of a pair of cap screws 56 and 58 (FIGS. 1, 3 and 6) threaded into the lower wear plate 22 near the front edge thereof. As will be understood, the cap screws 56 and 58 thus form stop means limiting the travel of the shuttle means in the rightward direction.

The studs 52 are to be oriented according to the position of the dog-point 54 at one end thereof, and the studs are fed to the enclosure 20 through a tubular conduit means 60 (FIGS. 1, 2, and 3) attached to the upper wear plate 24 by a coupling 62, with the individual studs moving in a steady stream through the conduit 60 in an end-to-end relationship, preferably under the influence of gravity. As will be understood by those skilled in the art, reciprocating hoppers have for some time been available on the open market which receive a quantity of randomly oriented parts such as the studs 52 and which will place the studs in an end-to-end relationship, so that they may enter a conduit such as 60 and slide by gravity to a place where they are to be used. Such a hopper does not, however, perform any specific sorting or orienting operation, and the relative position of the dog-point 54 on any given individual stud is likely to be either upwardly or downwardly as it travels through the conduit and is received by the device of the invention.

The upper wear plate 24 has a passage or hole 64 (FIG. 1) formed through it, with which the inlet conduit 60 communicates, through the coupling 62. With the shuttle means in its first position near the left of the enclosure 20, the chamber 44 within the head portion of the shuttle means is directly aligned and in register with the passage 64 and the conduit 60. Consequently, any stud or other such part present in the inlet conduit will fall directly into the shuttle chamber whenever the shuttle means is brought to its first or leftward position by the retraction of the pneumatic power cylinder 12.

Figure 6:
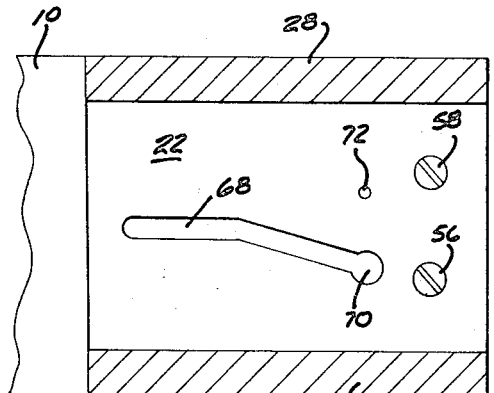
FIG. 6 is a fragmentary sectional plan view taken through the plane VI—VI of FIG. 3.
Figures 8A, 8B:
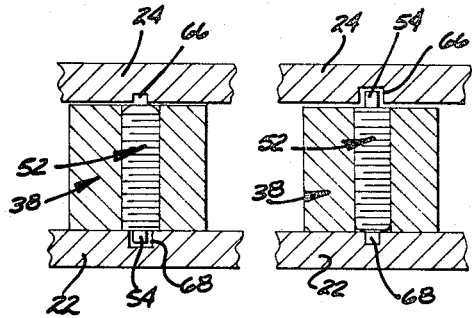
FIG. 8b is a fragmentary sectional elevation similar to FIG. 8a, but showing the stud in a second possible orientation.
Figure 7:
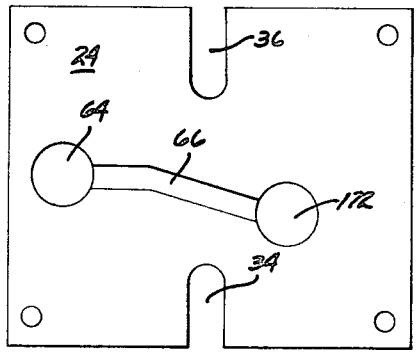
FIG. 7 is a sectional plan view taken through the horizontal plane VII—VII of FIG. 3.

Both the lower surface of the upper wear plate 24 and the upper surface of the lower wear plate 22 have a guideway 66 and 68, respectively, formed therein (FIGS. 6 and 7). These guideways are channel-like recesses cut into the wear plates in the angularly excursive manner shown in the respective figures. As may be observed, guideway 66 in the upper wear plate 24 commences at the hole 64 passing therethrough noted previously, and angles toward one lateral side of the box-like enclosure 20, whereas guideway 68 in the lower wear plate 22 commences at a similar starting position but angles toward the opposite side extremity of the enclosure 20. The guideways 66 and 68 are formed with a depth and a width such that either thereof will smoothly and slideably receive the dog-point portion 54 on any of the studs 52, thereby accommodating the amount which such stud protrudes beyond one side or the other of the chamber 44 in the shuttle means. This is illustrated in FIGS. 8a and 8b. In FIG. 8a a stud 52 is shown with the dog-point portion 54 thereof oriented downwardly and engaging guideway 68 in the lower wear plate 22, whereas FIG. 8b shows the reverse situation, in which the dog-point 54 is oriented upwardly and engaged in the guideway 66 of the upper wear plate 24. In either case, it will be observed that the end of the stud opposite the dog-point is of a diameter larger than the width of the guideway located adjacent thereto and consequently does not enter such guideway but instead remains directly adjacent the surface of the wear plate in which that guideway is formed.

Figure 9:
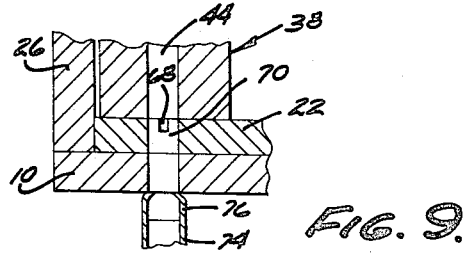
FIG. 9 is an enlarged, fragmentary, sectional elevation showing details of the apparatus as seen in FIG. 3.

As previously stated, the forward travel of the shuttle means 38 in response to extension of the plunger 18 from the power cylinder 12 moves the shuttle means toward the right as seen in the figures, until the shuttle is stopped at a predetermined position by abutment of the groove 42 in the head 40 of the shuttle against one or the other of the cap screws 56 or 58 threaded into the bottom wear plate 22. With the head portion of the shuttle means so positioned, the vertical hole or chamber 44 therein is positioned directly over one or the other of a pair of spaced apertures 70 or 72 formed through both the lower wear plate 22 and the base plate 10 (FIGS. 3, 6, 9 and 10). Aperture 70 marks the forward end extremity of guideway 68, and this aperture is of a diameter substantially the same as that of the chamber 44 in the shuttle means, being wider than the guideway 68 (FIG. 9).

As seen in FIGS. 3 and 9, aperture 70 communicates downwardly through the base plate 10 with a conduit 74 secured to the base plate by a coupling 76. Aperture 72, on the other hand, is of considerably smaller diameter than the shuttle means chamber (FIGS. 3 and 10), although it also extends downwardly through the base plate 10, to communicate with a conduit 78 coupled to the base plate by a coupling 80. With the upper wear plate 24 secured in position atop the enclosure 20, the guideway 66 formed in this wear plate terminates in an aperture 172 (FIGS. 3, 7 and 10) which is directly aligned over aperture 72 in the bottom wear plate 22. Aperture 172 is of at least as large as a diameter as the chamber 44 in the shuttle means, and it communicates with a conduit 82 which is connected to the upper wear plate by a coupling 84.

Mounted beneath the enclosure 20 of the device is a Y-type fixture 90 (FIGS. 1, 2, and 3). As illustrated, this is in essence a generally rectangular block having internal passages formed therein in the shape of a Y. A first arm 92 (FIG. 1) of this Y is interconnected, as by a coupling 94, to the conduit 74 which is coupled to and which leads from passage 70 (FIGS. 1 and 3) in the lower wear plate 22 and the base plate 10 of the enclosure. A second arm 96 of the aforesaid Y-shaped internal passage is connected, as by a coupling 98, to the conduit 82 which interconnects with the passage 172 in the upper wear plate 24 of the enclosure. The first and second arms 92 and 96 of the passage in the fixture 90 converge into an outlet passage 100 forming the leg of the aforesaid Y-shaped passage. A coupling 102 connects an outlet conduit 104 to the latter.

*Operation*

With the device of the invention assembled in the manner shown in the drawings and described above, a steady stream of parts such as the single dog-point studs 52 is supplied through the inlet conduit 60 in an end-to-end abutting relationship. As noted above, such a stream may be provided by use of a reciprocating supply hopper of a commercially available type. In such a stream, the dog-point 54 of the studs, or other similar end extremity of analogous parts, is equally likely to be oriented either upwardly or downwardly, and the object of the present device is to orient this stream of parts such that they leave the device in a continuous stream in which all such dog-points or other such singular end extremities occupy a predetermined position in the stream, such as at the forward end of the part.

The air inlet conduits 14 and 16 leading to the pneumatic power cylinder 12 are coupled to a source of pressurized air which will send such air into each conduit in an alternating sequence. As will be recognized, such a source may readily be provided by a conventional air pump or compressor and a four-way valve, together with a desired means for alternating actuation of the valve, such as a motor-driven rotary cam, an eccentric and yoke arrangement, or the like. The connection of such a valve to the inlet conduits 14 and 16 should be such that the valve alternatingly energizes first one conduit and then the other with pressurized air, while simultaneously relieving the air from the opposite conduit. In synchronism with the aforesaid alternating operation, the conduit 78 (FIGS. 1 and 3) which leads backward from passage 72 at the front portion of the enclosure should receive at least a brief burst of pressurized air whenever inlet conduit 16 is pressurized, for purposes to be subsequently stated. The supply to conduit 78 may very advantageously be provided by connecting this conduit to the aforesaid four-way valve in a manner whereby the air exhausted from conduit 14 during pressurization of conduit 16 will be fed through the valve outlet and into conduit 78, to thereby make use of this air, which otherwise would merely be vented to the atmosphere.

By reference to FIGS. 1 and 2, it will be apparent that pressurization of inlet conduit 14 extends the plunger means 18 and pushes the shuttle means 38 toward the front of the enclosure 20, to the second position of the shuttle means, whereas pressurization of air inlet conduit 16 returns the plunger 18 back to the position shown in FIGS. 1 and 2, thus returning the shuttle means to its first position, also shown in these figures. Thus, it may be perceived that the aforesaid connection of conduit 78 to receive the pressurized air exhausted from inlet conduit 14 will result in the presence of pressurized air in conduits 78 and 16 at about the same time. In actuality, however, it takes at least a brief length of time for the air admitted into inlet conduit 16 to build up pressure within the power cylinder 12 before its plunger means is actually forced to retract, whereas the pressurized air relieved from the cylinder via conduit 16 is present in conduit 78 immediately and actually arrives at passage 72 in the enclosure 20 before the power cylinder plunger and the shuttle means are forced to retract back to their initial positions.

With the shuttle means 38 of the device in its first or leftward position, the first stud within the supply conduit 60, i.e., the one closest to the enclosure 20, will drop downwardly out of the supply conduit 60 and directly into the chamber 44 within the shuttle means, which is aligned directly beneath this conduit when the shuttle means is in its first position. If the dog-point end 54 of this stud happens to be pointed downwardly, it will fall directly into the guideway 68 in the lower wear plate 22, since the initial portion of this guideway is located directly beneath the lower end of the chamber in the shuttle means when the latter is in its first or leftward position. With the dog-point end 54 of the stud located within guideway 68, the opposite end extremity of this stud is positioned flush with the top surface of the shuttle means (FIG. 8a), in which position such opposite end extremity abuts the downward end of the next succeeding stud in supply conduit 60 and holds such stud upwardly, out of the shuttle means chamber 44. Compressed air is then supplied to inlet conduit 14, causing the plunger 18 of the cylinder to quickly be extended, thereby sending the shuttle means toward the right, to its second position. As the shuttle means moves away from its first position, the stud within the shuttle means chamber is moved out from beneath the lowermost stud in the inlet conduit 60; however, this stud cannot drop downward because it then rests against the top surface of the shank portion 41 of the shuttle, along which it slides as the shuttle means moves beneath the upper wear plate 24 and the stud inlet aperture 64 therein which communicates with supply conduit 60.

The movement of the shuttle means toward the right within the enclosure is guided by the engagement of the dog-point 54 on the stud 52 within the guideway 68. Consequently, as the pneumatic cylinder pushes the shuttle means along, the shuttle follows the angularly excursive path defined by this guideway, until the groove 42 in the front of the shuttle means head comes into abutting contact with the stop means machine screw 56 located near the front of the enclosure (FIGS. 3 and 6). At the point where the shuttle means is stopped by the screw 56, the stud carried within the shuttle means chamber is immediately dropped downwardly out of the chamber, directly into passage 70 (FIGS. 3 and 9) and into conduit 74, through which it continues to drop downwardly into the fixture 90, through the arm 92 thereof, into the leg 100 thereof, and out of the outlet conduit 104, in its dog-point-first attitude. All of this happens very quickly, of course, as the shuttle means comes into abutment against the stop screw 56. Consequently, the shuttle means may quickly be returned to its first or leftward position by pressurized air then admitted to the inlet conduit 16, which causes the power cylinder to retract the plunger 18 and the shuttle means 38 back toward the left.

Figure 10:
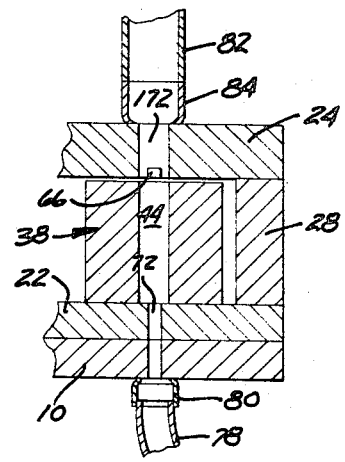
FIG. 10 is an enlarged, fragmentary, sectional elevation showing other details of the structure as seen in FIG. 3.

As the shuttle means is returned to its first or leftward position, the rounded rear surfaces of the head portion 40 of the shuttle come into contact with the similarly rounded concave forward portions of the stop blocks 55 located at the leftward extremity of the enclosure 20. This stops the shuttle means and holds it in an indexed position, with the shuttle means chamber 44 directly aligned beneath inlet passage 64 and supply conduit 60, as before. As soon as this occurs, the lowermost stud or other such part in the inlet conduit drops downwardly into the then-empty shuttle means chamber, in the same manner as the previous stud did. If, for example, the dog-point 54 on this next succeeding stud happens to be pointed upwardly, the relationship shown in FIG. 8b will occur, in which the dog-point will be located within guideway 66 in the upper wear plate 24, whereas the opposite end of the stud, being too large to fit into the lower guideway 68, will merely rest on the upper surface of the lower wear plate 22. As pressurized air is fed into inlet conduit 14 of the power cylinder, the shuttle is sent to its second or rightward position as before; however, instead of being guided by guideway 68 in the lower wear plate, in the manner explained previously, the shuttle means is now guided by guideway 66 in the upper wear plate. Consequently, instead of coming into abutment with the stop screw 56 as before, the shuttle means will now come into abutment against the other stop screw 58, on the opposite side of the lower wear plate. In this position, the shuttle means chamber 44 is directly aligned over passage 72 in the lower wear plate (FIG. 10). However, since this passage is smaller in diameter than the stud, the stud cannot drop downwardly through it. Instead, the stud rests on the lower wear plate in this position for a very brief interval until pressurized air is sent to inlet conduit 16 of the power cylinder.

At this point, the burst or pulse of pressurized air noted previously, which occurs as the air from within the cylinder is exhausted out of conduit 14, is supplied through conduit 78 (FIG. 10) and passage 72, upwardly against the bottom of the stud resting in the shuttle means chamber. This instantly propels the stud upward and out of the chamber, so that it enters conduit 82 in a dog-point-first attitude. As noted previously, conduit 82 loops directly around (FIG. 1) and enters the Y-type fixture 90. Consequently, the stud is sent through the internal passage 96 of this fixture in a dog-point-forward attitude, which is the same attitude as that of studs which merely drop downwardly out of the enclosure through the passage 92 of the fixture. Thus, studs traveling through conduit 82 and passage 96 in fixture 90 fall downwardly through the leg passage 100 of this fixture and out of the outlet conduit 104 in the same manner and in the same orientation as studs traveling the alternate route.

In this manner, it will be apparent that randomly oriented studs or other such parts supplied in an intermixed end-to-end relation through the inlet conduit 60 will be uniformly oriented and supplied in a consistent manner out of the outlet conduit 104 as fast as the shuttle means 38 is reciprocated between its first and second positions. Thus, parts like single dog-point studs may for the first time be used in manufacturing and assembling techniques with the same automated equipment used in connection with symmetrical parts whose end extremities are the same and which need not be oriented. The device of the invention is, in and of itself, relatively simple from a mechanical point of view; it needs no surveillance or operator, and it is subjected to very little wear during the most extended periods of use while producing consistent and substantially foolproof results.

I claim:
1. A device for orienting randomly positioned parts of the same size and shape with a pair of physically different opposite end extremities such that a given one such end extremity always occurs in a predetermined position, said device comprising in combination: a shuttle means reciprocable between first and second positions and having a chamber with oppositely disposed ends each having an opening therein, said chamber arranged for receiving a single such part and holding the same in an established general orientation in which at least one of said end extremities protrudes out of one of said chamber end openings; means for feeding said randomly positioned parts into said shuttle chamber; means defining a pair of guideways having a peripheral side of a size and shape to slidably engage a selected one of said part end extremities protruding from said chamber; one of said guideways having a starting end portion located immediately adjacent one of said shuttle chamber end openings when the shuttle means is in its said first position, said one guideway extending to a first terminal location at said second shuttle means second position; the other of said guideways having a starting end portion located immediately adjacent the other of said shuttle chamber end openings when the shuttle is in its said first position and extending to a second terminal location at said shuttle means second position but spaced from said first terminal location; and means defining first and second passages opening through said first and second terminal locations respectively and communicating thereat with said one and said other shuttle chamber end openings respectively; said shuttle means when reciprocated receiving individual parts in its said chamber at its said first position and being guided in moving said individual parts to one of said first or second terminal locations by the engagement of the said selected one end of the part in said chamber with said one or said other guideway, depending upon whether said selected one end of said part is oriented toward said one or said other chamber end opening when that particular part is in said chamber; said first and second passages being of a size with respect to said parts such that individual parts when moved to said first or second terminal locations pass into and move through the particular passage located thereat, said parts thereby being consistently oriented in each such passage so that the said selected one end of each part therein points in the same direction.

2. The device defined in claim 1, further including stop means for abutting said shuttle means at its said first and second positions to insure accurate positioning of the shuttle means thereat.

3. The device defined in claim 1, wherein each of said guideways comprise a channel recess having a cross-sectional shape and size to receive only said one selected end of said parts and thereby engage such end.

4. The device defined in claim 3, wherein said shuttle means chamber is vertically oriented, and wherein one of said channel recesses is located above said chamber and in alignment with the upper end opening thereof, while the other such recess is located below said chamber and in alignment with the lower end opening thereof.

5. The device defined in claim 1, further including means for integrating the oriented parts passing into each of said passages into a single stream of parts, with each part in said single stream having its said selected one end pointing in the same direction.

6. The device defined in claim 5, wherein said means for integrating said parts includes a structure in flow communication with one of said passages for receiving the parts present therein, and means for inserting said parts received by said structure into the stream of parts in the other of said passages.

7. The device defined in claim 4, further including means for integrating the oriented parts passing into each of said passages into a single stream of parts, with each part in said single stream having its said selected one end pointing in the same direction.

8. The device defined in claim 7, wherein said means for integrating said parts includes a structure in flow communication with one of said passages for receiving the parts present therein, and means for inserting said parts received by said structure into the stream of parts in the other of said passages.

9. The device defined in claim 8, wherein said means for integrating said parts includes means for extracting parts upwardly from the said passage opening through the terminal location of said one channel located above said shuttle means chamber.

10. The device defined in claim 9, wherein said means for extracting parts upwardly includes means for projecting an upwardly-directed jet of air through said chamber and passage.

11. The device defined in claim 10, wherein the last said means includes a pneumatic power cylinder having a plunger member coupled to said shuttle means for reciprocating the latter between its said first and second positions.

12. The device defined in claim 11, further including stop means for abutting said shuttle means at its said first and second positions to insure accurate positioning of the shuttle means thereat.

References Cited
UNITED STATES PATENTS

| | | | |
|---|---|---|---|
| 2,696,902 | 12/1954 | Bailey et al. | 193—43 X |
| 2,713,930 | 7/1955 | Koch. | |
| 2,742,135 | 4/1956 | Zubay | 198—31 |
| 3,161,274 | 12/1964 | Lanz | 302—2 X |

EVON C. BLUNK, *Primary Examiner.*

R. J. HICKEY, *Assistant Examiner.*

U.S. Cl. X.R.

302—2